(12) United States Patent
Yang et al.

(10) Patent No.: US 11,687,166 B2
(45) Date of Patent: Jun. 27, 2023

(54) IMAGE PROCESSING SYSTEM AND IMAGE PROCESSING DEVICE

(71) Applicant: Lixel Inc., Taipei (TW)

(72) Inventors: Chun-Hsiang Yang, Hsinchu (TW); Chih-Hung Ting, New Taipei (TW); Kai-Chieh Chang, Kaohsiung (TW); Ta-Kai Lin, Hsinchu (TW); Yu-Hsien Li, New Taipei (TW)

(73) Assignee: LIXEL INC., Taipei (TW)

( * ) Notice: Subject to any disclaimer, the term of this patent is extended or adjusted under 35 U.S.C. 154(b) by 0 days.

(21) Appl. No.: 17/204,020

(22) Filed: Mar. 17, 2021

(65) Prior Publication Data

US 2022/0137711 A1     May 5, 2022

(30) Foreign Application Priority Data

Oct. 30, 2020   (TW) ................................ 109137783

(51) Int. Cl.
*G06F 3/01*         (2006.01)
*G02B 30/56*      (2020.01)
*G06F 3/04815*   (2022.01)

(52) U.S. Cl.
CPC ............. *G06F 3/017* (2013.01); *G02B 30/56* (2020.01); *G06F 3/011* (2013.01); *G06F 3/04815* (2013.01)

(58) Field of Classification Search
CPC ...... G06F 3/017; G06F 3/04815; G06F 3/011; G02B 30/56
See application file for complete search history.

(56) References Cited

U.S. PATENT DOCUMENTS

2006/0088206 A1\*   4/2006   Era ..................... H04N 13/261
                                             348/E13.067
2018/0364885 A1\*   12/2018   Melencio ............... G06F 3/015
2019/0265781 A1\*   8/2019   Kehoe ................... G06F 1/1686
2021/0263612 A1\*   8/2021   Shinohara .............. G06F 3/017

FOREIGN PATENT DOCUMENTS

TW          M485448 U     9/2014
TW           I700516 B     8/2020

\* cited by examiner

*Primary Examiner* — Adam R. Giesy
(74) *Attorney, Agent, or Firm* — Li & Cai Intellectual Property (USA) Office

(57) ABSTRACT

An image processing system and an image processing device are provided. The image processing system includes an electronic device and the image processing device. The image processing device is connected to the electronic device. The image processing device displays a floating three-dimensional input device image information. The image processing device interacts with an object through the three-dimensional input device image information to generate a plurality of control signals, and transmits the plurality of control signals to the electronic device.

6 Claims, 18 Drawing Sheets

IMAGE PROCESSING SYSTEM AND IMAGE PROCESSING DEVICE

CROSS-REFERENCE TO RELATED PATENT APPLICATION

This application claims the benefit of priority to Taiwan Patent Application No. 109137783, filed on Oct. 30, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image processing system and an image processing device, and more particularly to an image processing system and an image processing device by which an image information can be processed intuitively.

BACKGROUND OF THE DISCLOSURE

Currently, results of a design can only be judged on a display device of an image processing system. If a processed image information shows a product model or an interior design, although the image information can be swiveled around on the screen at various angles, it is still not as intuitive as displaying the image information directly in front of the eyes of a user.

Accordingly, providing an image processing system by which the image information can be intuitively processed and displayed has become one of the important issues to be solved in the relevant field.

SUMMARY OF THE DISCLOSURE

In response to the above-referenced technical inadequacies, the present disclosure provides an image processing system that includes an electronic device and an image processing device. The image processing device is connected to the electronic device. The image processing device displays a floating three-dimensional input device image information, and the image processing device interacts with an object through the three-dimensional input device image information to generate a plurality of control signals and transmits the plurality of control signals to the electronic device.

Therefore, one of the beneficial effects of the present disclosure is that, the image processing system and the image processing device provided in the present disclosure can not only complete the general image processing procedure on the computer, but can also directly display the two-dimensional or the three-dimensional image information in an upper space of the image processing device. The user can directly and more intuitively interact with the three-dimensional image information displayed and control and adjust the three-dimensional image information using a gesture or an audio information.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, in which.

DETAILED DESCRIPTION OF THE EXEMPLARY EMBODIMENTS

Figure 1:
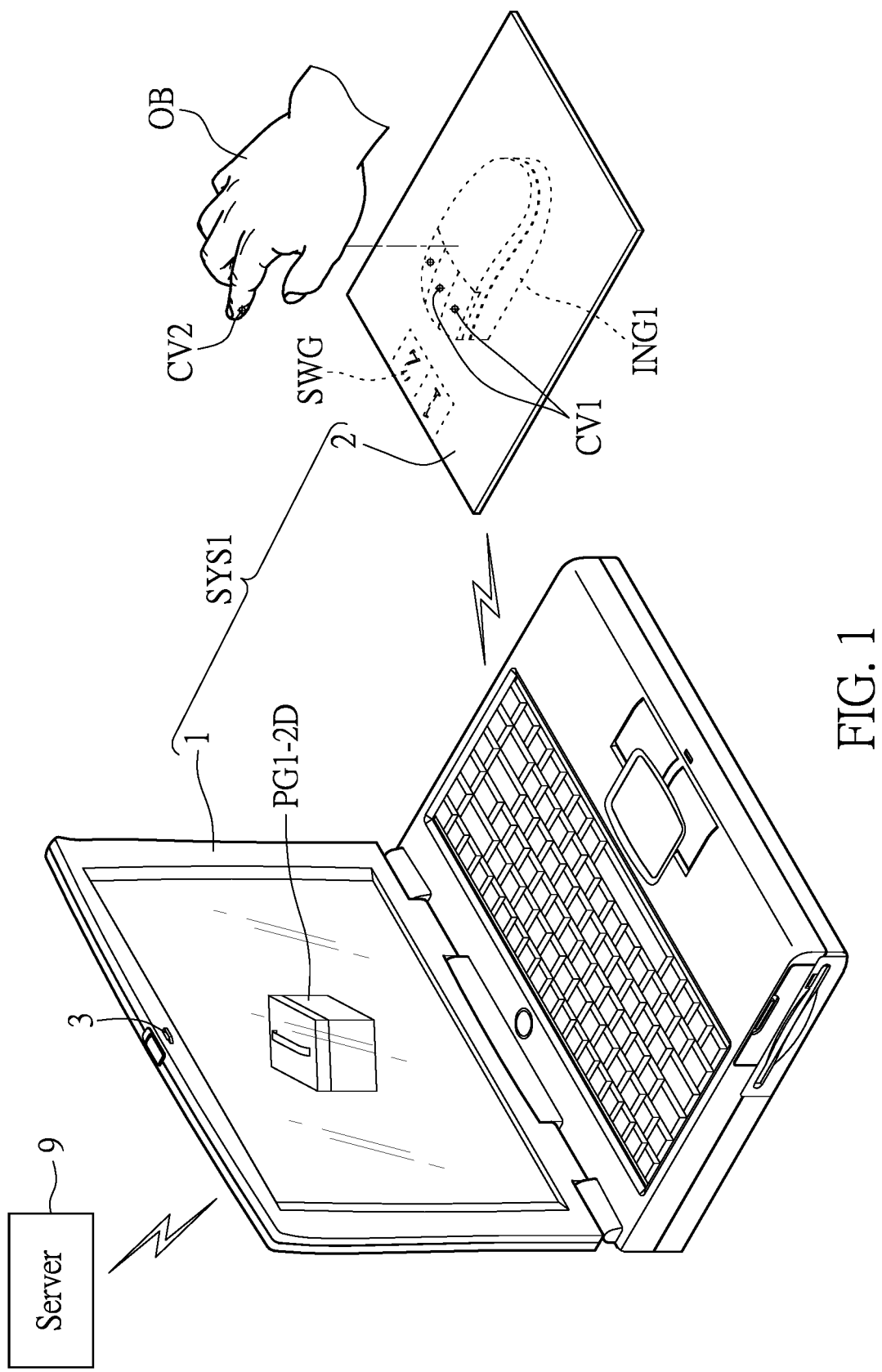
FIG. 1 is a schematic view of an image processing system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
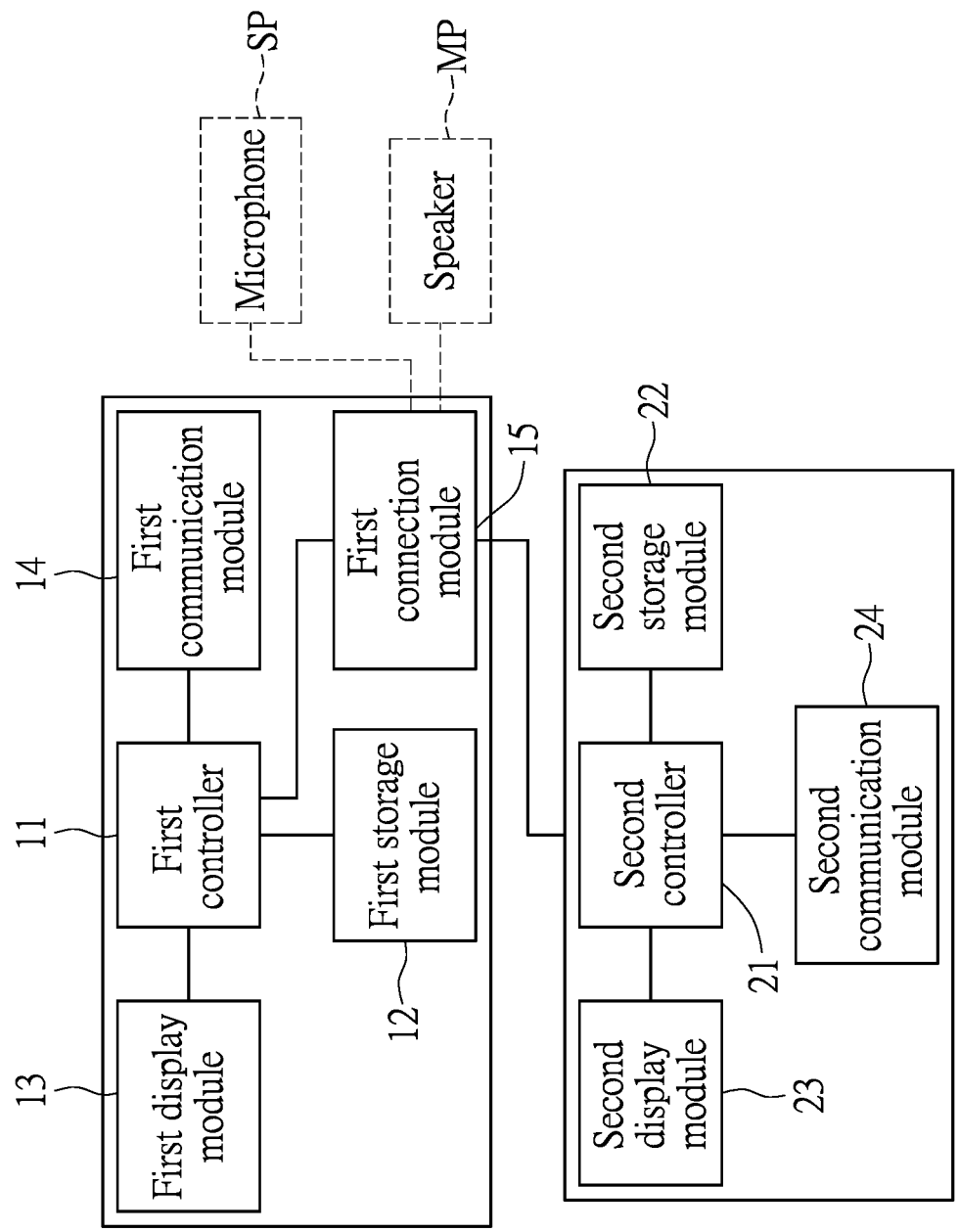
FIG. 2 is a functional block diagram of the image processing system according to the first embodiment of the present disclosure.

Reference is made to FIG. 1 and FIG. 2, in which FIG. 1 is a schematic view of an image processing system according to a first embodiment of the present disclosure, and FIG. 2 is a functional block diagram of the image processing system according to the first embodiment of the present disclosure.

The image processing system SYS1 includes an electronic device 1 and an image processing device 2. The image processing device 2 is connected to the electronic device 1. The electronic device 1 is a desktop computer, a laptop computer, a tablet computer, a smart phone, a wearable electronic device or a server. In the present embodiment, the electronic device 1 is a laptop computer.

In the present embodiment, each of the electronic device 1 and the image processing device 2 can include a wired communication module or a wireless communication module for communication connection.

The image processing device 2 can be used to display a two-dimensional image information or a three-dimensional image information. When the image processing device is used to display the two-dimensional image information, a user can view the two-dimensional image information by looking directly at an upper plane of the image processing device 2, or the two-dimensional image information can be displayed on top of the image processing device 2. As shown in FIG. 1, the two-dimensional image information is displayed on top of the image processing device 2. When the image processing device 2 is used to display the three-dimensional image information, the three-dimensional image information is displayed in a space on an upper side of the image processing device 2 through the light field principle. That is, in the present embodiment, the three-dimensional image information displayed by the image processing device 2 floats in the space above the image processing device 2. The user can use a hand, an article or a tool to interact with the floating three-dimensional image information displayed by the image processing device 2. The user can interact directly with the three-dimensional image information and does not need to interact with the virtual image in the display device through a wearable display device.

In the present embodiment, the image processing device 2 displays a floating three-dimensional input device image information ING1. The image processing device 2 can interact with an object OB through the three-dimensional input device image information ING1 to generate a plurality of control signals and transmit the plurality of control signals to the electronic device 1.

The electronic device 1 includes a first controller 11, a first storage module 12, a first display module 13, a first communication module 14 and a first connection module 15.

The first controller 11 is correspondingly connected to the first storage module 12, the first display module 13, the first communication module 14 and the first connection module 15. The image processing device 2 includes a second controller 21, a second storage module 22, a second display module 23, a second communication module 24 and a second connection module 25. The second controller 21 is correspondingly and electrically connected to the second storage module 22, the second display module 23 and the second communication module 24.

Figure 3:
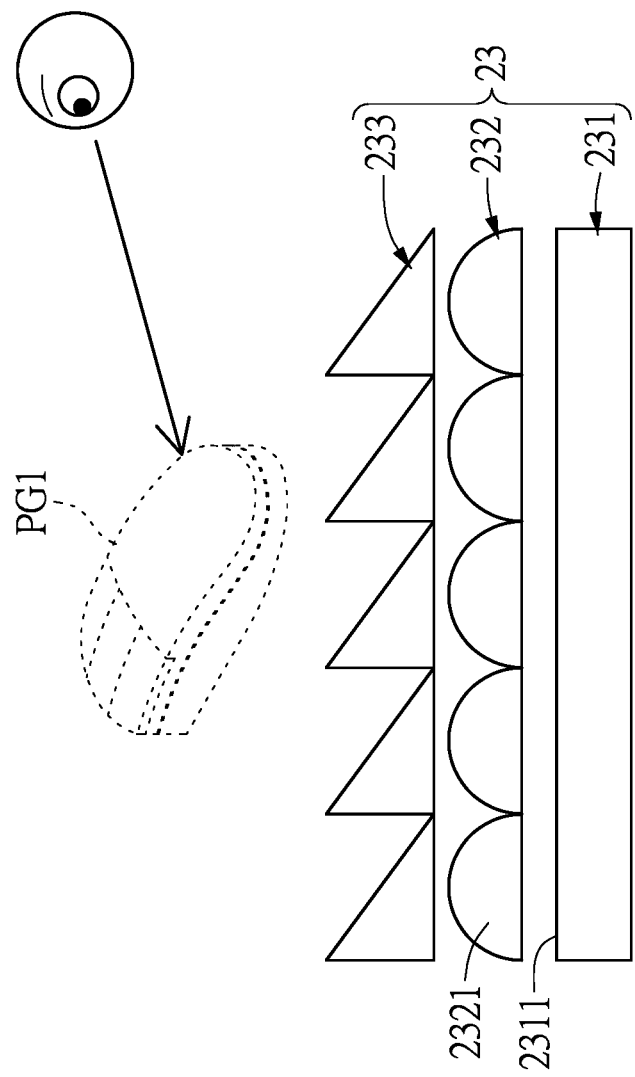
FIG. 3 is a structural view of the image processing system according to the first embodiment of the present disclosure.

Reference is made to FIG. 3, in which FIG. 3 is a structural view of the image processing system according to the first embodiment of the present disclosure. The second display module 23 includes a flat display module 231, a lens array layer 232 and a microstructure layer 233. The flat display module 231 has a display surface 2311. The flat display module 231 is used to provide a two-dimensional image information, and display a three-dimensional image information through the lens array layer 232 and the microstructure layer 233. The lens array layer 232 is disposed on the display surface 2311 of the flat display module 231 and receives the light of the two-dimensional image information for adjustment. The lens array layer 232 includes a plurality of lenses 2321. The lens array layer 232 is used for modulating a light field.

The microstructure layer 233 is disposed on the lens array layer 232. The microstructure layer 233 includes a plurality of microstructures. The microstructure layer 233 is used for adjusting an angle and a direction of light. The microstructure layer 233 receives light through the lens array layer 232 and adjusts the light so that a floating three-dimensional image information is displayed in a space on one side of the second display module 23.

The lens 2321 of the lens array layer 232 conforms to the oscilloscope formula: $1/f=(n-1)(1/R1+1/R2)$, where R1 and R2 are correspondingly the radii of curvature on two side of the lens 2321, f is the focal length of the lens and n is the refractive index of the lens.

In addition, the microstructure layer 233 is a dynamic optical component layer. That is, the microstructure layer 233 has a microstructure function mode and a non-microstructure function mode. The microstructure layer 233 can be adjusted to the microstructure function mode or the non-microstructure function mode according to the control signal. When the microstructure 233 is switched to the microstructure function mode, the microstructure 233 can be used to adjust the angle and the direction of light. When the microstructure layer 233 is switched to the non-microstructure mode, the second display module 23 is used for displaying the two-dimensional image information, instead of displaying the three-dimensional image information floating in the space on the one side of the second display module 23. The microstructure layer 233 is a liquid crystal lens array layer, which includes a plurality of microstructure liquid crystal lens. The lens array layer 232 is also a liquid crystal lens array layer, which includes a plurality of optically adjusted liquid crystal lens. That is, the second display module 23 is a display device including at least two liquid crystal lens array layers. In another embodiment, the second display module 23 can include more liquid crystal lens array layers for light adjustment. Further, in another embodiment, the second display module 23 of different quantities may be provided in different areas for light adjustment. In addition, the lens array layer 232 includes a first structure lens array layer (not shown in the figures) and a second structure lens array layer (not shown in the figures). The first structure lens array layer (not shown in the figures) has a lens structure that can be used for modulating the light field, and the second structure lens array layer (not shown in the figures) does not have a lens structure.

Figure 4:
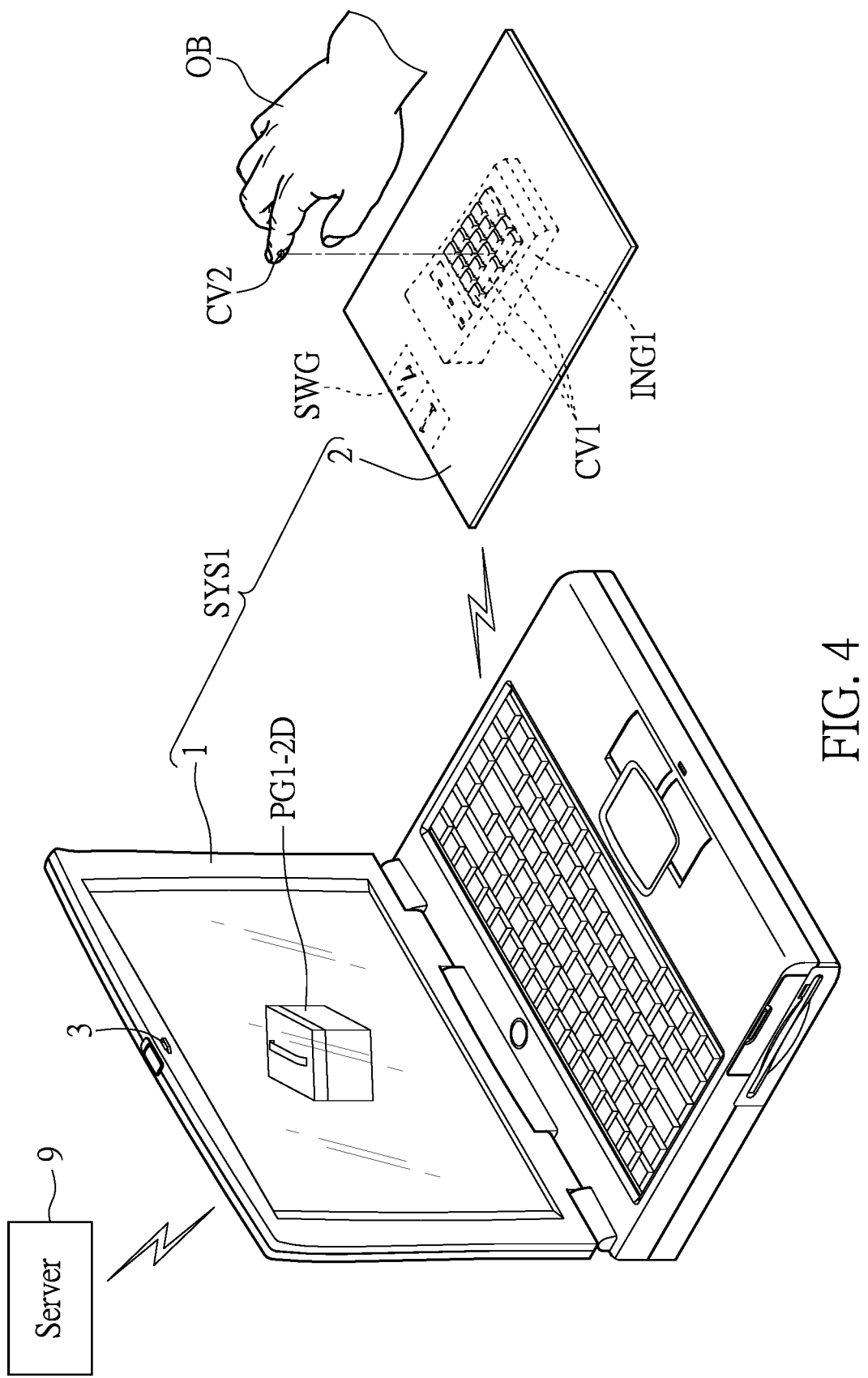
FIG. 4 is a schematic view of the image processing system providing another three-dimensional input device image information according to the first embodiment of the present disclosure.

Reference is made to FIG. 4, in which FIG. 4 is a schematic view of the image processing system providing another three-dimensional input device image information according to the first embodiment of the present disclosure.

In the present embodiment, when the image processing device 2 displays a three-dimensional input device image information ING1, the image processing device 2 can further display a switch key image information SWG. The image processing device 2 can generate a switch signal through the user or the object OB interacting with the switch key image information SWG. The image processing device 2 transmits the switch signal to the electronic device 1, and the electronic device 1 displays another three-dimensional input device image information ING1, such as a three-dimensional keyboard device image information, according to the switch signal.

Figure 5:
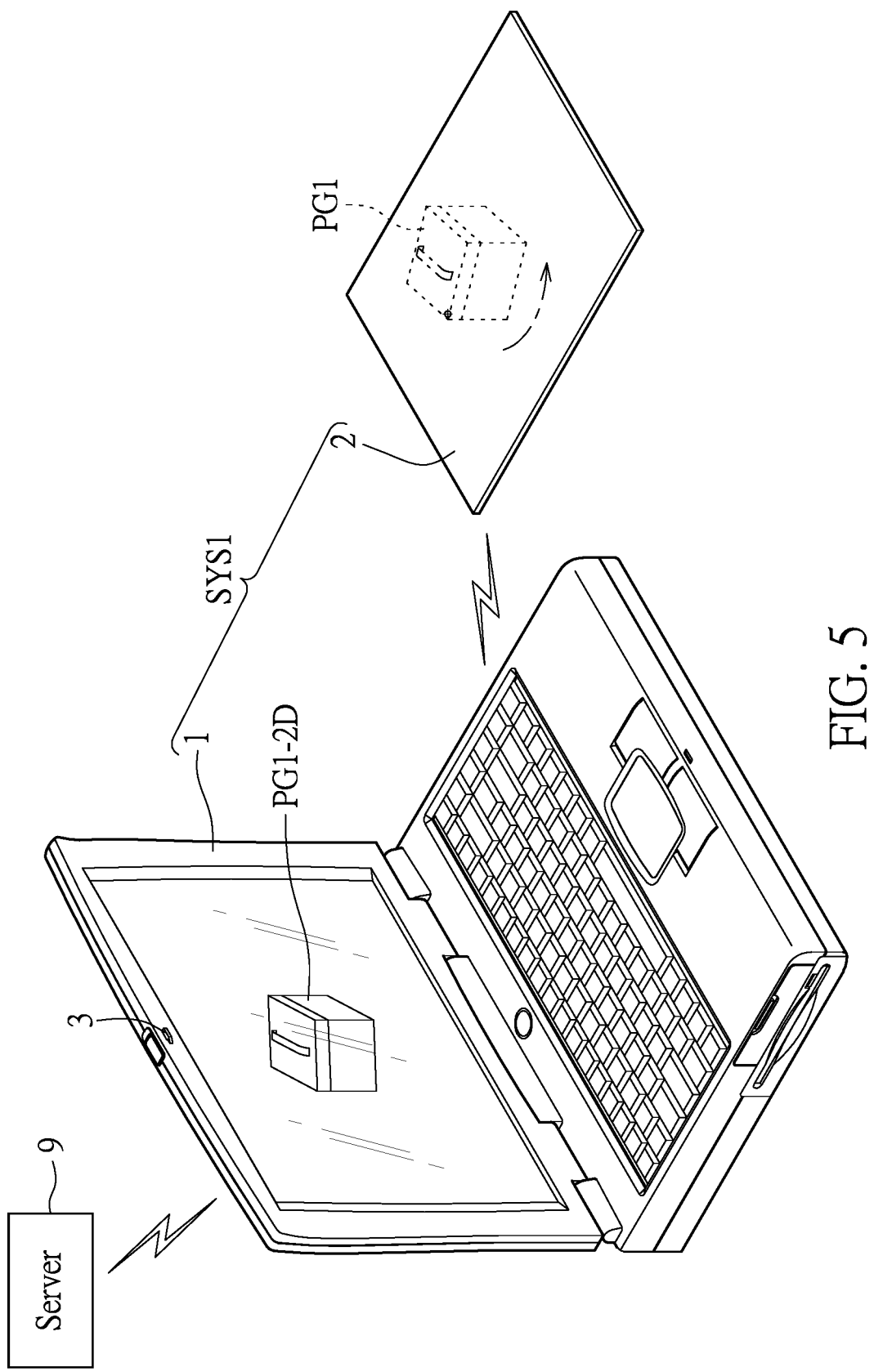
FIG. 5 is a schematic view of the image processing system displaying a project image information according to the first embodiment of the present disclosure.
Figure 6:
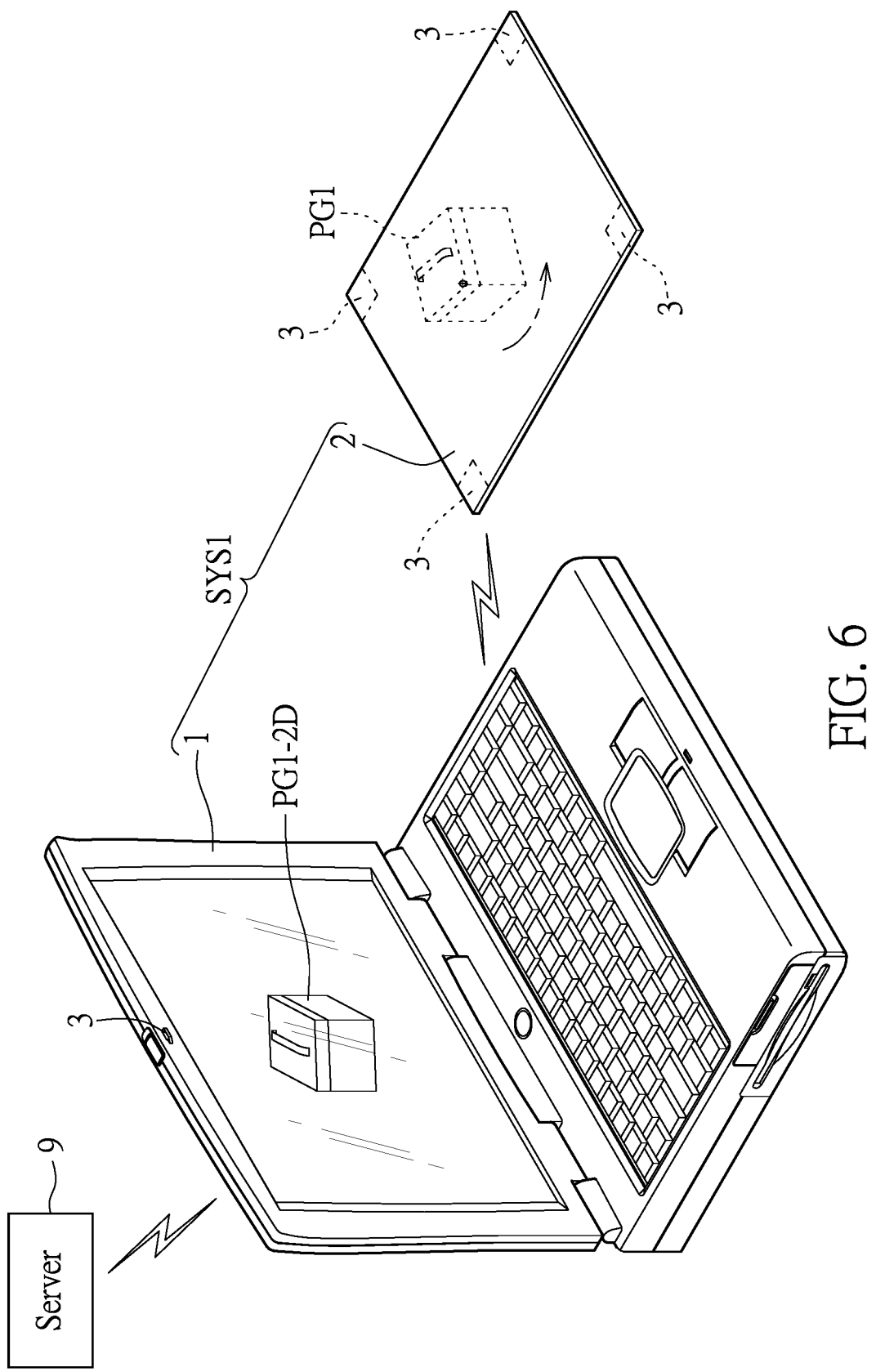
FIG. 6 is a schematic view of the image processing system displaying the project image information which interacts with an object according to the first embodiment of the present disclosure.
Figure 7:
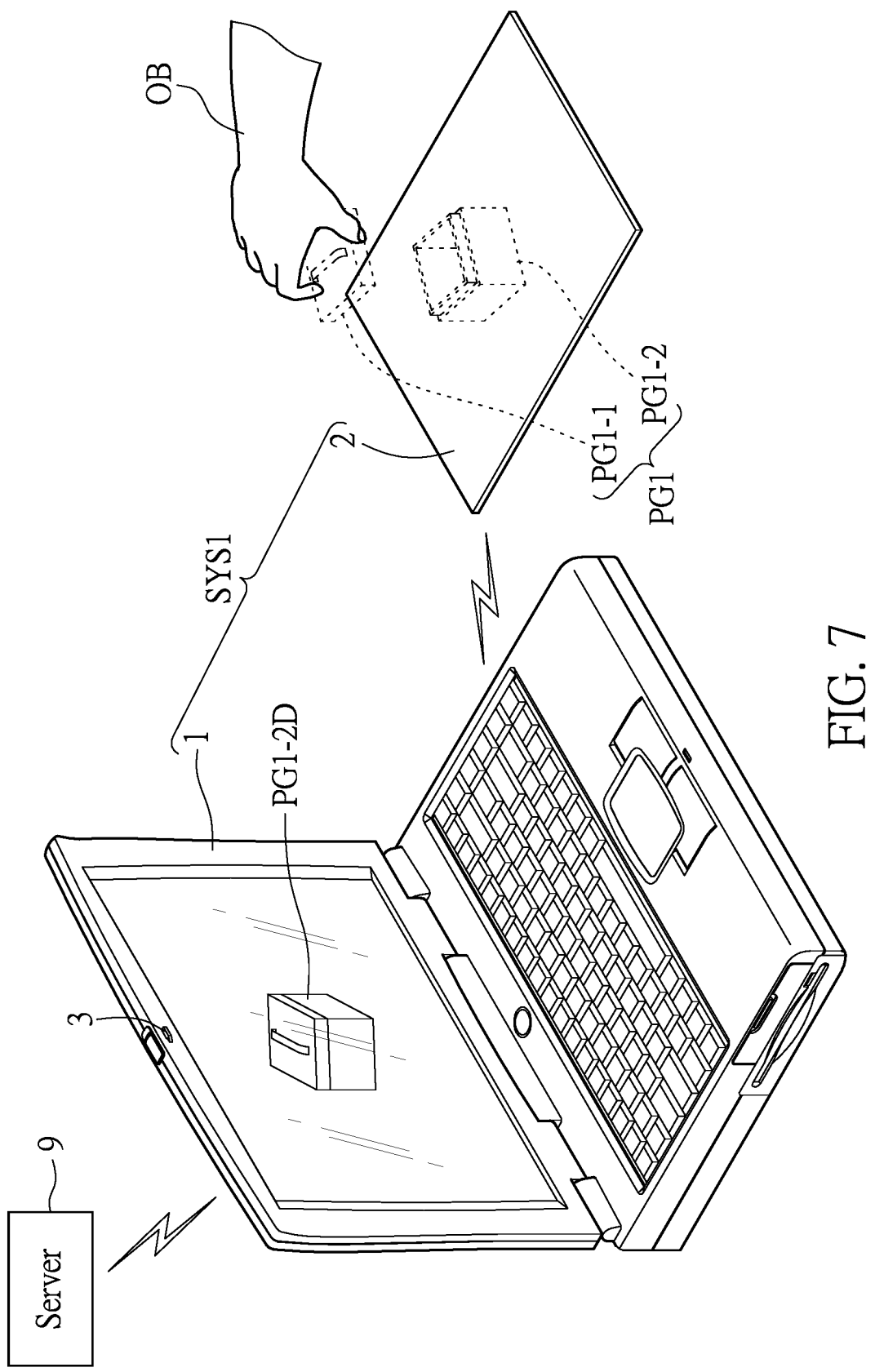
FIG. 7 is a schematic view of the image processing system displaying the project image information in an exploded view according to the first embodiment of the present disclosure.
Figure 8:
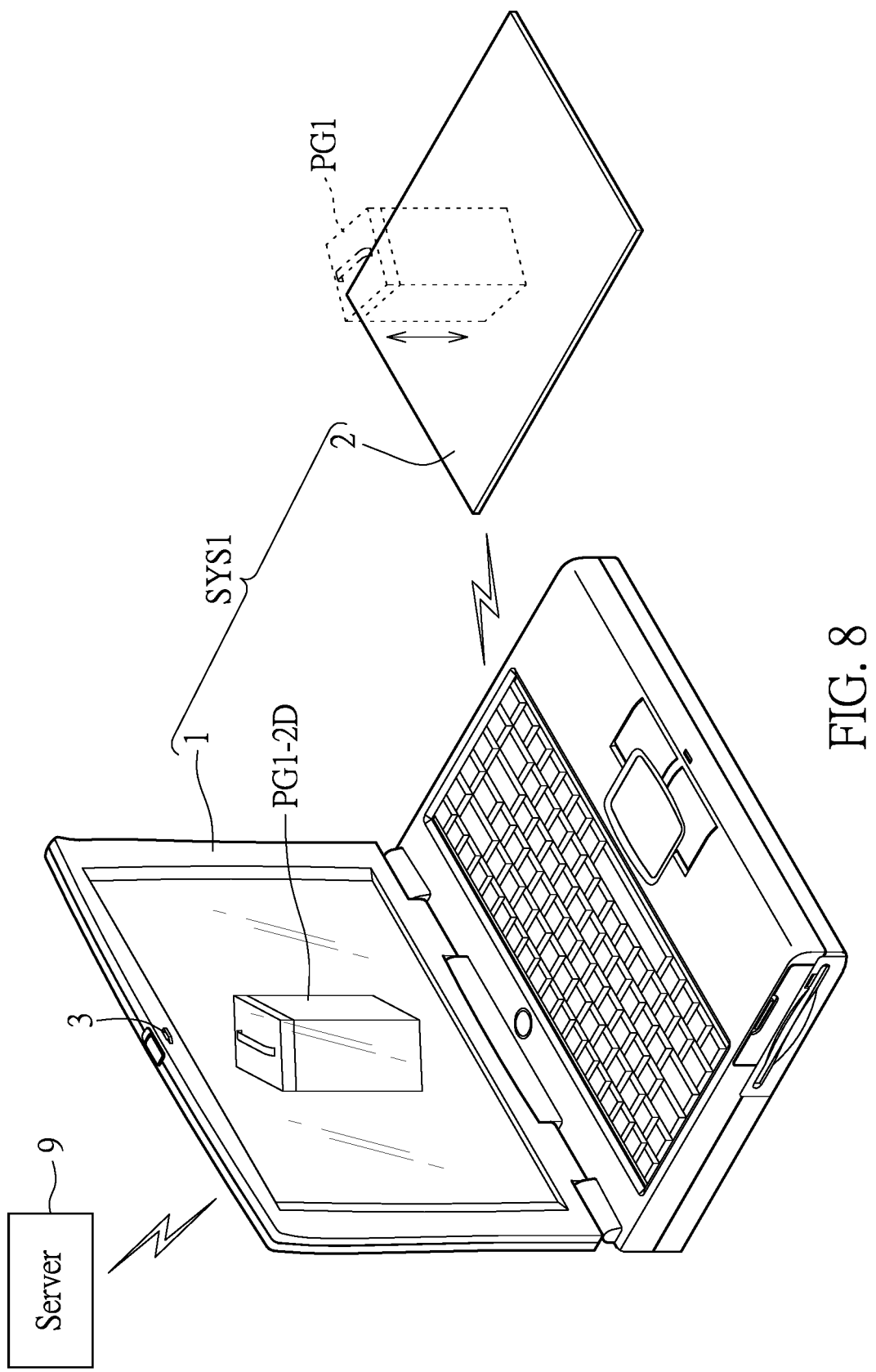
FIG. 8 is a schematic view of the project image information interacting with an object of the present disclosure.

Reference is made to FIG. 5 to FIG. 8, in which FIG. 5 is a schematic view of the image processing system displaying a project image information according to the first embodiment of the present disclosure, FIG. 6 is a schematic view of the image processing system displaying a project image information according to the first embodiment of the present disclosure, FIG. 7 is a schematic view of the image processing system displaying a project image information in an exploded view according to the first embodiment of the present disclosure, and FIG. 8 is a schematic view of the project image information interacting with an object of the present disclosure.

In the present embodiment, the image processing system SYS1 further includes a sensor 3 which is disposed on the electronic device 1 or the image processing device 2. The sensor 3 can also be disposed independently. The sensor 3 is a visible light image capturing unit, a thermal image capturing unit, an infrared image capturing unit or an ultrasonic detection unit. The sensor 3 is used for capturing a plurality of three-dimensional coordinate values CV2 of the object OB and a plurality of three-dimensional coordinate values CV1 of project image information PG1.

The object OB is the hand of the user, an article or a tool. That is, the user can directly use his/her own limbs or pen-type articles to directly contact the three-dimensional image information.

In addition, the image processing system SYS1 further includes a microphone MP and a speaker SP. The microphone MP and the speaker SP are connected to the electronic device 1 and the image processing device 2. The user can use an audio control signal to control and interact with the three-dimensional input device image information ING1 through the microphone MP and the speaker SP.

The three-dimensional input device image information ING1 is a mouse device image information, a keyboard image information, a touchpad device image information or a handwriting tablet device image information.

The image processing device 2 can generate a plurality of control signals through the three-dimensional input device image information ING1 interacting with the object OB, and transmit the plurality of control signals to the electronic device 1.

The user can use his/her hands to click on the three-dimensional input device image information ING1, and the sensor 3 then detects the plurality of three-dimensional coordinate values CV2 of the hands of the user, such as the coordinate values of the fingertips and the coordinate values of the finger joints, to determine the interaction between the user's hand, i.e., the object OB, and the three-dimensional input device image information ING1. When the user clicks a left or right button of the three-dimensional input device ING1, the sensor 3 detects the click action of the right index finger of the user, and the sensor 3 provides a change rate of the coordinate values of the right index finger of the user to the image processing device 2 that determines and provides a click control signal to the electronic device 1 according to the change rate of the coordinate values of the right index finger of the user.

A first program is provided in the electronic device 1. The first program can be a three-dimensional drawing program or a game program. The electronic device 1 regulates the first program, for example, the electronic device 1 adjusts or controls a project in the first program, according to the plurality of control signals transmitted by the image processing device 2.

Assuming that the first program is a three-dimensional drawing program, and the three-dimensional input device image information ING1 is a mouse device image information, the user can adjust or control a project in the three-dimensional drawing program by clicking or moving the three-dimensional input device image information.

When the project in the first program constructs or draws the two-dimensional image information or the three-dimensional image information, a project image information PG1-2D of the project in the first program can be displayed through the image processing device 2. That is, the image processing device 2 can be used as a display device for the project image information PG1-2D of the project in the first program. Because the image processing device 2 can display the three-dimensional image information and the two-dimensional image information, the project image information PG1-2D in the first program, which is the image information displayed on the electronic device 1, can be displayed directly in three-dimensional or two-dimensional form in a space above the image processing device 2.

In addition, the user can also interact with the project image information PG1 of the image processing device 2. First, the user can enlarge/shrink of the project image information PG1 by using different gestures. For example, the project image information PG1 is enlarged by enlarging a distance between the thumb and the index finger. Or, the project image information PG1 is shrunk by reducing a distance between the thumb and the index finger. In addition, the user can also use two hands to hold two different corners of the three-dimensional project image information PG1 to make more obvious zoom-in or zoom-out movements.

Further, the user can also use gestures to rotate the project image information PG1 at various angles. For example, the project image information PG1 is rotated 180 degrees to the left, 180 degrees upward, 45 degrees to the right, etc., as shown in FIG. 5 and FIG. 6.

In addition, when the project image information PG1 includes a plurality of project sub-image information PG1-1 to PG1-2, the plurality of three-dimensional coordinate values CV2 of the object OB can interact with a plurality of first three-dimensional coordinate values of one of the plurality of project sub-image information PG1-1 to PG1-2 to determine a plurality of second three-dimensional coordinate values of the one of the plurality of project sub-image information PG1-1 to PG1-2.

As shown in FIG. 7, when the project image information PG1 includes the plurality of project sub-image information PG1-1 to PG1-2 and the plurality of project sub-image information PG1-1 to PG1-2 can be separated from each other, the user can use the hand or the article to enable the plurality of project sub-image information PG1-1 to PG1-2 that are separated to be displayed, such as an exploded view in three-dimensional form. The user can also disassemble the project sub-image information PG1-1 or the project sub-image information PG1-2 of the project image information PG1 for individual processing.

The user can select one of the plurality of project sub-image information PG1-1 to PG1-2 and move it in a same way as moving an actual object, so that the three-dimensional coordinate values of the one of the plurality of project sub-image information PG1-1 to PG1-2 can be changed from the plurality of first three-dimensional coordinate values to the plurality of second three-dimensional coordinate values. In addition, the plurality of first three-dimensional coordinate values of the one of the plurality of project sub-image information PG1-1 to PG1-2 are different from the corresponding plurality of second three-dimensional coordinate values of the one of the plurality of project sub-image information PG1-1 to PG1-2.

In addition, referring to FIG. 8, the user can also enlarge, shrink or further adjust the shape of the project image information PG1, the project sub-image information PG1-1 or the project sub-image information PG1-2. Moreover, the results of user adjustments made by interacting with the three-dimensional project image information PG1 can also be stored in the project in the first program of the electronic device 1.

In the present embodiment, the first controller 11 and the second controller 21 can each be a central processing unit (CPU), an application specific integrated circuit (ASIC), a graphics processing unit (GPU) or a microcontroller (MCU). The first storage module 12 and the second storage module 22 can each be a flash memory, a read-only memory, a programmable read-only memory, an electrically rewritable read-only memory, an erasable and programmable read-only memory or an electrically-erasable programmable read-only memory.

The first communication module 14 and the second communication module 24 can correspondingly include a wired communication unit (not shown in the figures) and a wireless communication unit (not shown in the figures). The respective wired communication units of the first communication module 14 and the second communication module 24 (not shown in the figures) can also be independently set up to communicate with a server 9 to receive control signals from the server 9 or data from a database of the server 9 (not shown in the figures). The respective wireless communication units of the first communication module 14 and the second communication module 24 (not shown in the figures) can each be a WI-FI® communication unit, a BLUETOOTH® communication unit, a Zigbee® communication unit, a LoRa communication unit, a Sigfox communication unit or an NB-IoT communication unit. In the present embodiment, the sensor 3 is an image capturing unit such as charge-coupled device (CCD). The first display module 13 and the second display module 23 can each be a liquid crystal display, a micro light emitting diode (LED) display or an organic light emitting diode display (OLED display). The first connection module 15 can be a type-A universal serial bus (USB) connector, a LIGHTNING® connector, a type-C USB connector or a micro-USB connector.

In addition, in the present embodiment, the two-dimensional image information or the three-dimensional image information can correspondingly be calculated in the electronic device 1, the image processing device 2 or the server 9, which is not limited thereto in the present disclosure. The calculation on the server 9 is performed through cloud computing on a remote server 9, and then the two-dimensional image information or the three-dimensional image information is transmitted to the electronic device 1 or the image processing device 2.

Second Embodiment

Figure 9:
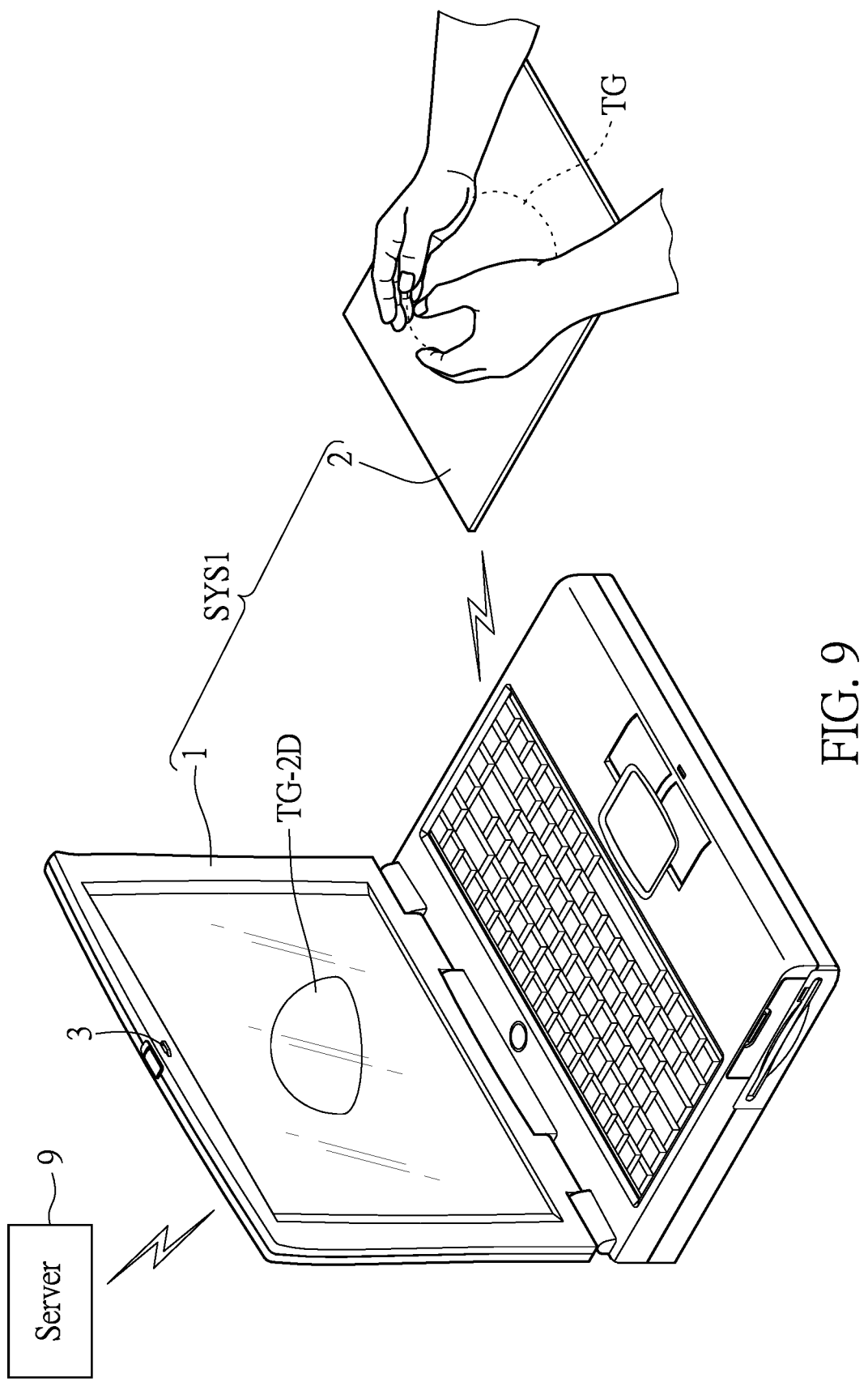
FIG. 9 is a schematic view of a project image information interacting with an object in real time according to a second embodiment of the present disclosure.
Figure 10:
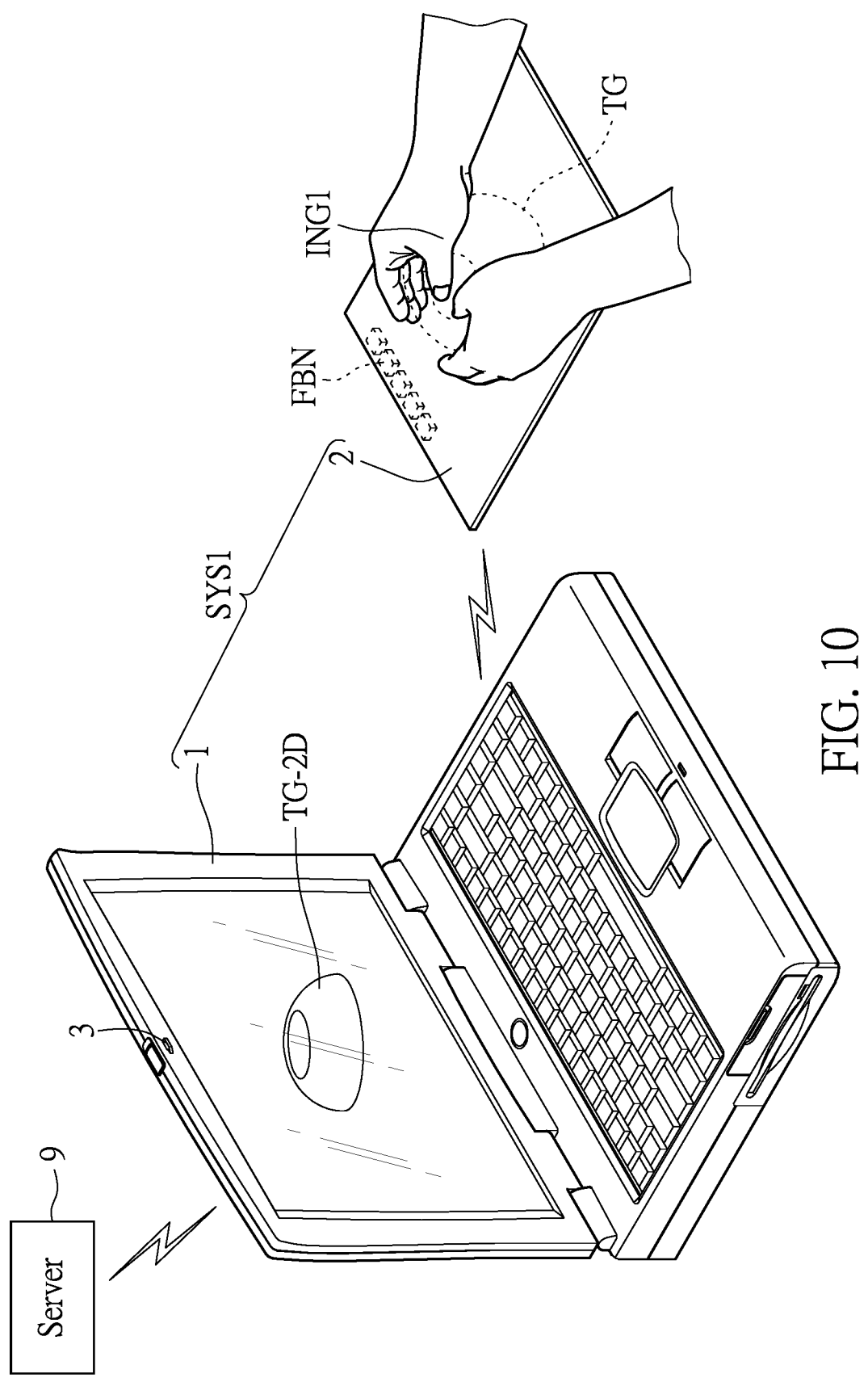
FIG. 10 is another schematic view of the project image information interacting with the object in real time according to the second embodiment of the present disclosure.
Figure 11:
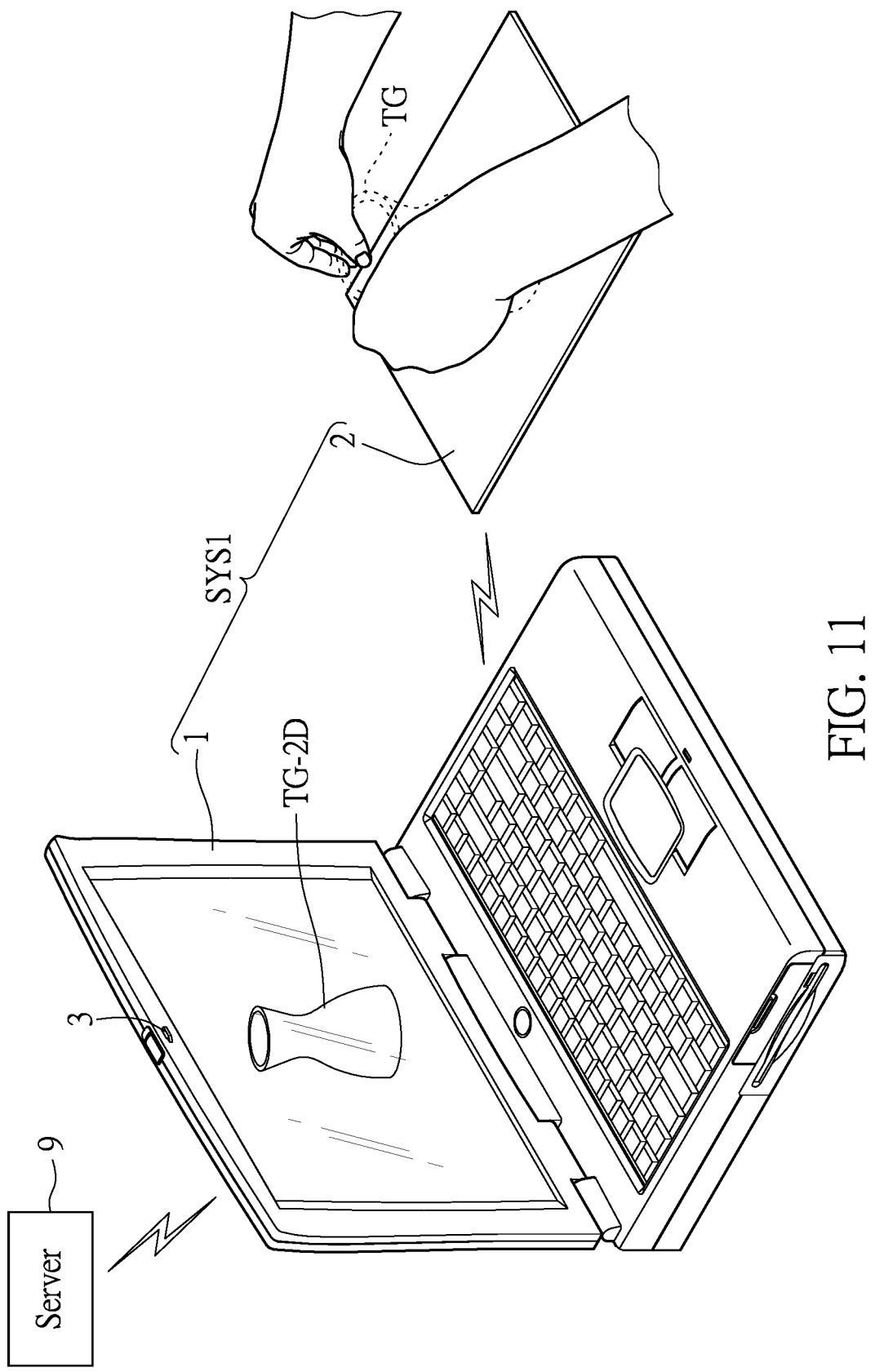
FIG. 11 is still another schematic view of the project image information interacting with the object in real time according to the second embodiment of the present disclosure.

Reference is made to FIG. 9 to FIG. 11, in which FIG. 9 is a schematic view of a project image information interacting with an object in real time according to a second embodiment of the present disclosure, FIG. 10 is another schematic view of a project image information interacting with an object in real time according to the second embodiment of the present disclosure, and FIG. 11 is still another schematic view of a project image information interacting with an object in real time according to the second embodiment of the present disclosure.

In the present embodiment, the electronic device 1 and the image processing device 2 can display a clay image information TG on one side of the image processing device 2. The electronic device 1 can display a two-dimensional clay image information TG-2D. The image processing device 2 can display a three-dimensional clay image information TG. The electronic device 1 or the image processing device 2 can rotate the clay image information TG according to ways in which pottery or porcelain can be made. That is, the clay image information TG, i.e., the three-dimensional project image information, is rotated according to a predetermined angular velocity. The predetermined angular velocity can be adjusted during the production process according to user needs.

As shown in FIG. 9, the user can interact with the clay image information TG with both hands to deform the clay image information TG to produce a deformed clay image information TG, i.e., a deformed three-dimensional project image information. That is, the user can use the image processing system in the present embodiment to interact with the clay image information TG through their hands to complete a hand-made model.

In the present embodiment, a deformation state of the clay image information TG is determined by the rigidity and viscosity of the clay itself and the hand posture of the user.

Further, in the present embodiment, the electronic device 1 and the image processing device 2 perform calculation according to a plurality of surface coordinate values of the clay image information TG and a plurality of coordinate values of a finger surface of the user, and calculate a corresponding change of the clay image information TG according to a change degree of the coordinate values of the finger surface of the user or the coordinate values of the hand of the user, i.e., the change rate of coordinates per second, and the angular velocity of the clay image information TG during rotation.

In the present embodiment, the electronic device 1 or the image processing device 2 may use a sensor 26 to detect a coordinate value of a predetermined detection point of the object OB, i.e., the hand of the user, such as the index finger of the user, at least one of predetermined coordinate values of an electronic interactive glove ECL, or a predetermined coordinate value of a pen tip of a pen-type interactive component PT. The sensor 3 continuously records a movement track of the predetermined detection point of the object OB within a predetermined time. The sensor 3 transmits a plurality of coordinate values of the movement track of the predetermined detection point of the object OB within the predetermined time to a controller of the electronic device 1 (not shown in the figures) or a controller of the image processing device 2 (not shown in the figures). The controller of the electronic device 1 (not shown in the figures) or the controller of the image processing device 2 (not shown in the figures) further displays the movement track and the clay image information TG through the second display module 23. That is, the user can use the image processing device 2 to directly interact with the clay image information TG, and even draw lines, planar compositions or three-dimensional compositions arranged on a surface of the clay image information TG.

The user can also draw a plurality of tracks in a space on one side of the image processing device 2 using the pen-type interactive component PT or the electronic interactive glove ECL. These tracks are then moved, adjusted or connected, and then arranged on the surface of the clay image information TG.

In addition, a second program in the image processing device 2 includes a plurality of function processing programs that correspond to a plurality of three-dimensional function buttons FBN. The plurality of three-dimensional function buttons FBN are displayed in the same space on the one side of the image processing device 2 as the clay image information TG through the second display module 23.

The user can select one of the plurality of three-dimensional function buttons FBN, such as coloring, enlarging, adjusting the material, etc., to process partial or all areas of the clay image information TG.

That is, the user can selectively process flat areas, three-dimensional areas or all areas formed by the plurality of tracks.

In addition, the image processing device 2 can communicate with a server (not shown in the figures) through a communication module (not shown in the figures). The server (not shown in the figures) can perform a calculation of a plurality of tracks of a large number of three-dimensional project image information 3DG. That is, in the present embodiment, the calculation of the two-dimensional image information and the three-dimensional image information can be performed by the image processing device 2, or can be done through cloud computing on the remote server (not shown in the figures), and then the two-dimensional image information that is calculated or the three-dimensional image information that is calculated is transmitted to the image processing device 2.

Figure 12:
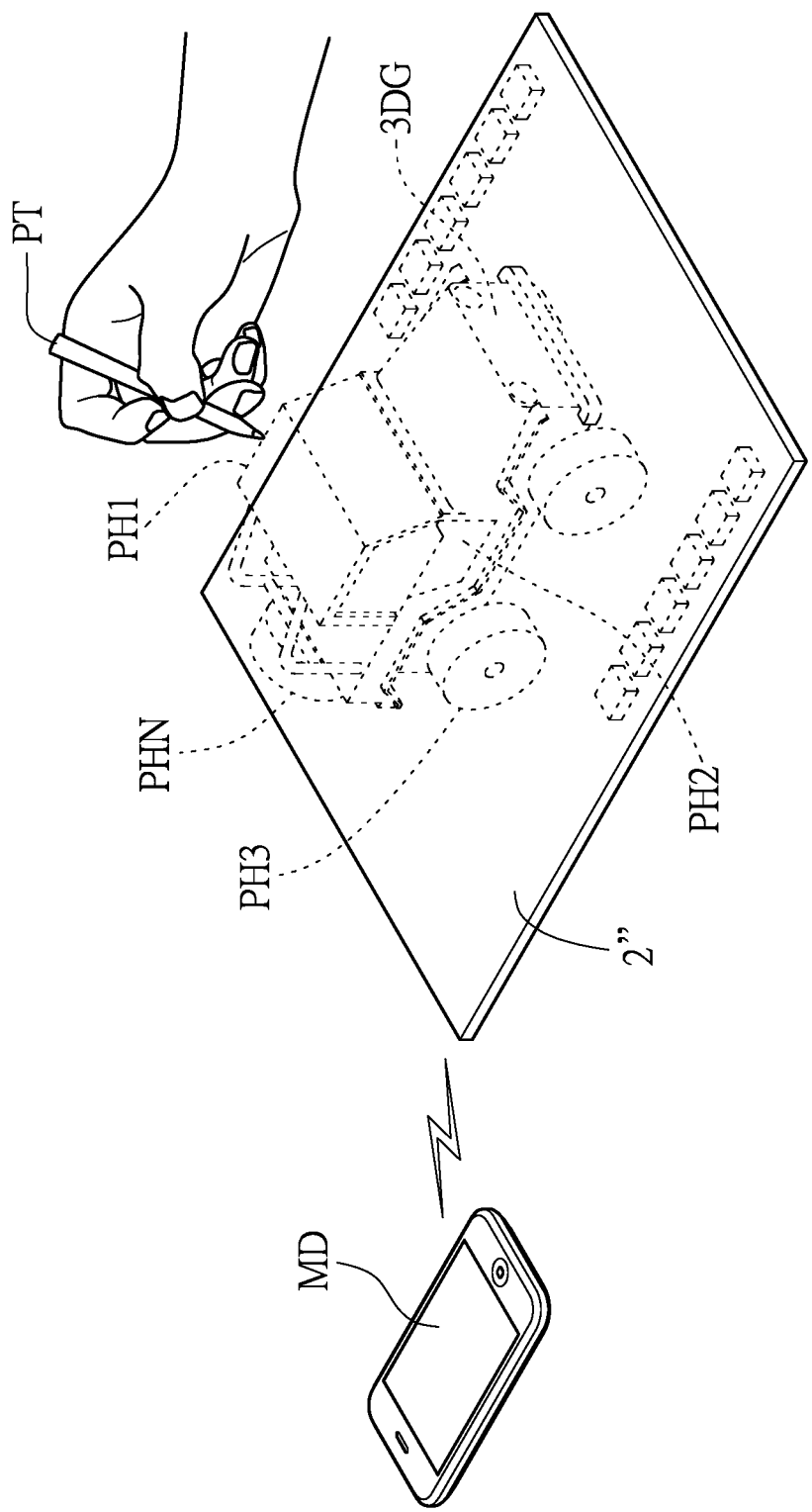
FIG. 12 to FIG. 14 are correspondingly another schematic views of the image processing system according to the second embodiment of the present disclosure.
Figure 13:
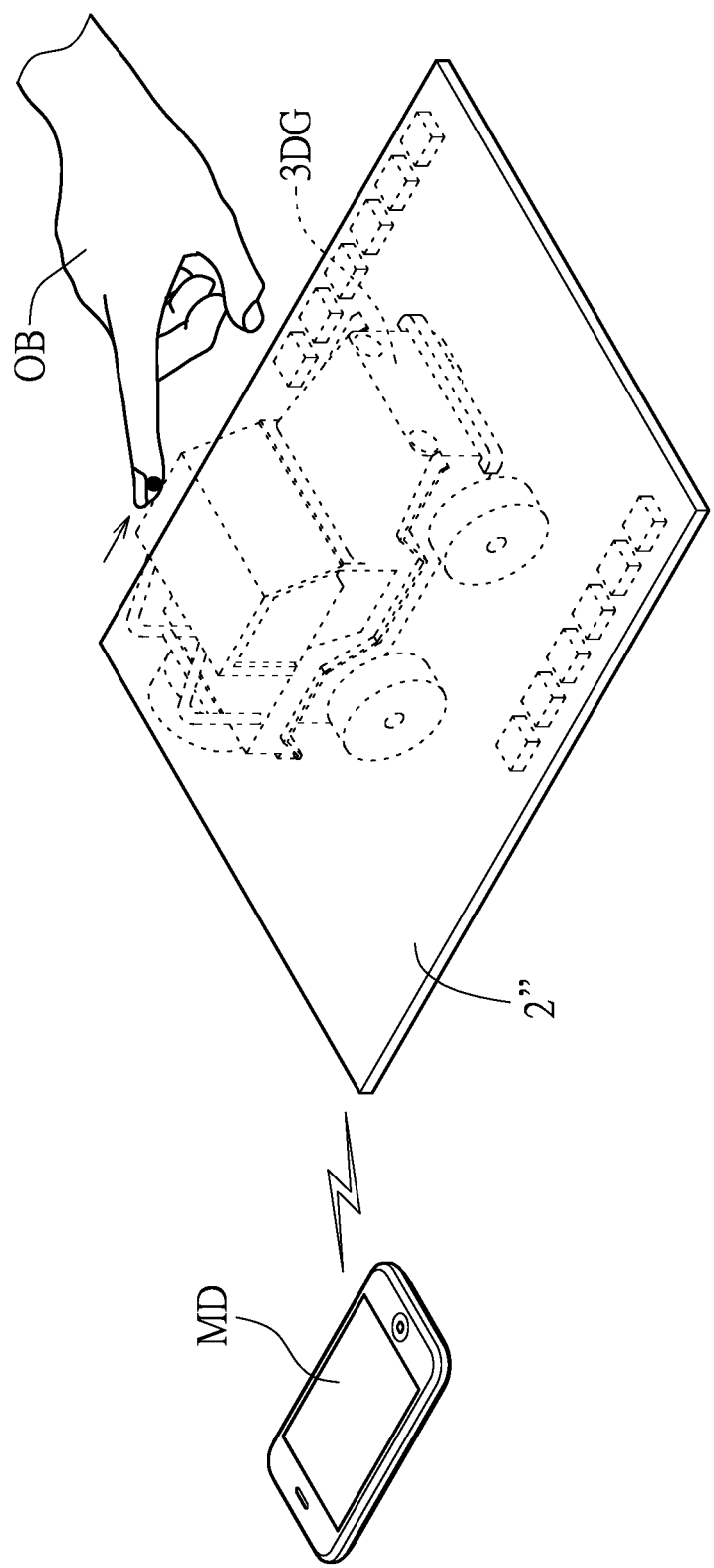
Figure 14:
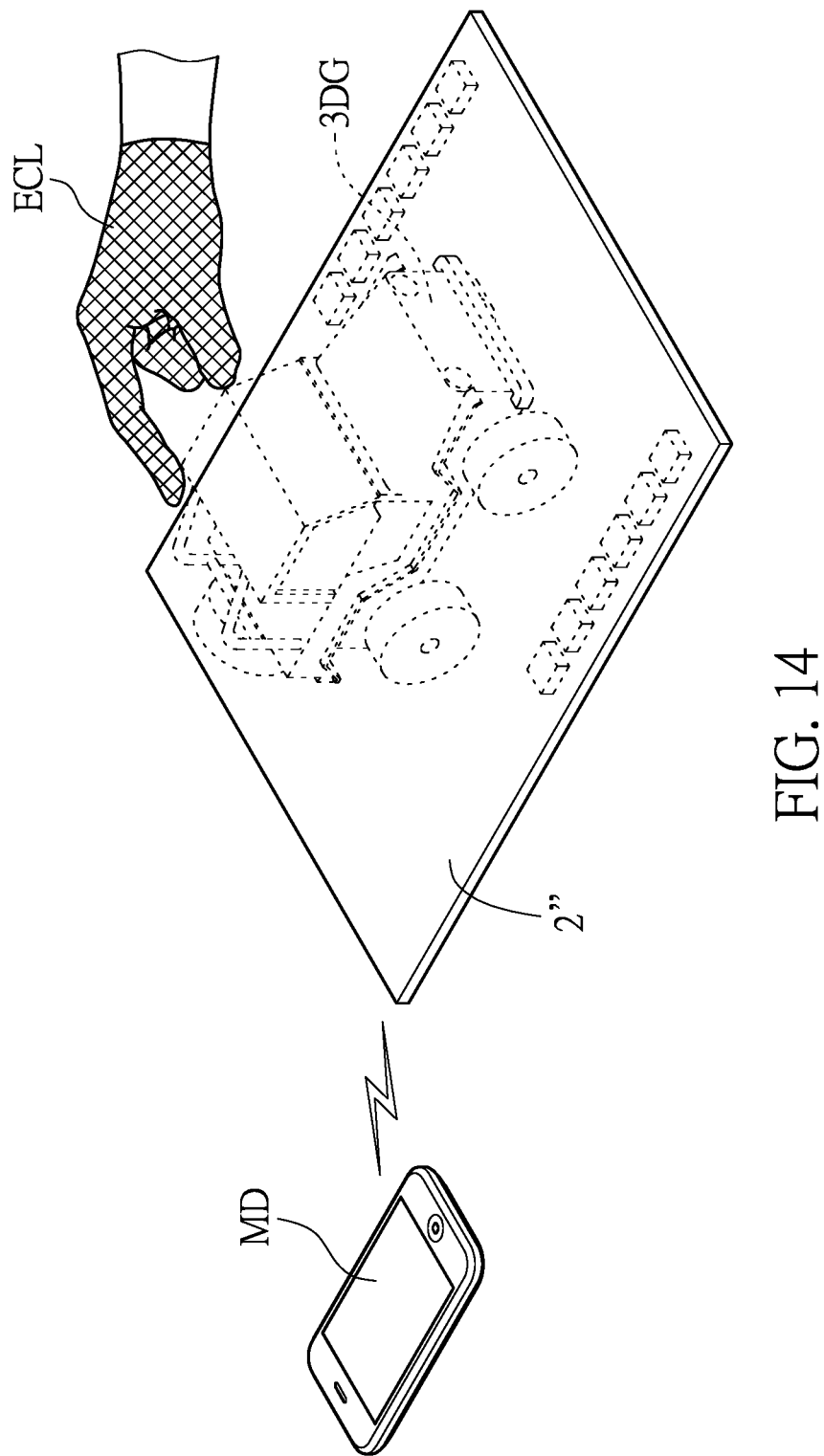

Referring to FIG. 12 to FIG. 14, in the image processing system SYS1, the electronic device 1 can be a smart phone MD connected to the image processing device 2, as shown in FIG. 12 to FIG. 14. In addition, the electronic device 1 can further include a tablet computer, a desktop computer or a smart bracelet. Moreover, the user can interact with and regulate the three-dimensional image information of the image processing device 2 using the finger, the pen-type interactive component PT, the electronic interactive glove ECL, etc.

Third Embodiment

Figure 15:
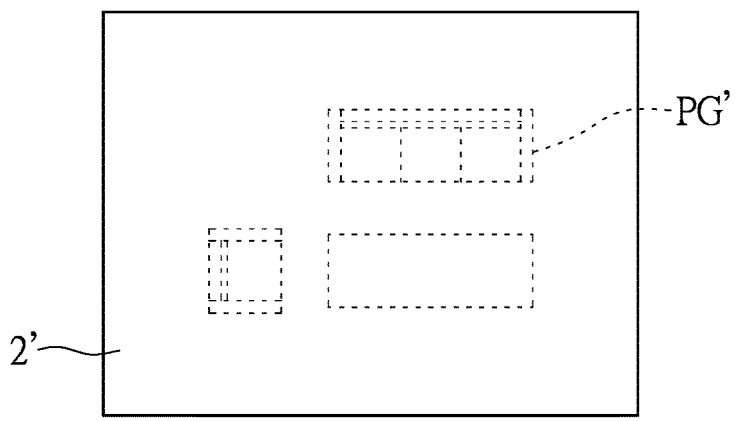
FIG. 15 is a schematic view of an image processing system according to a third embodiment of the present disclosure.
Figure 16:
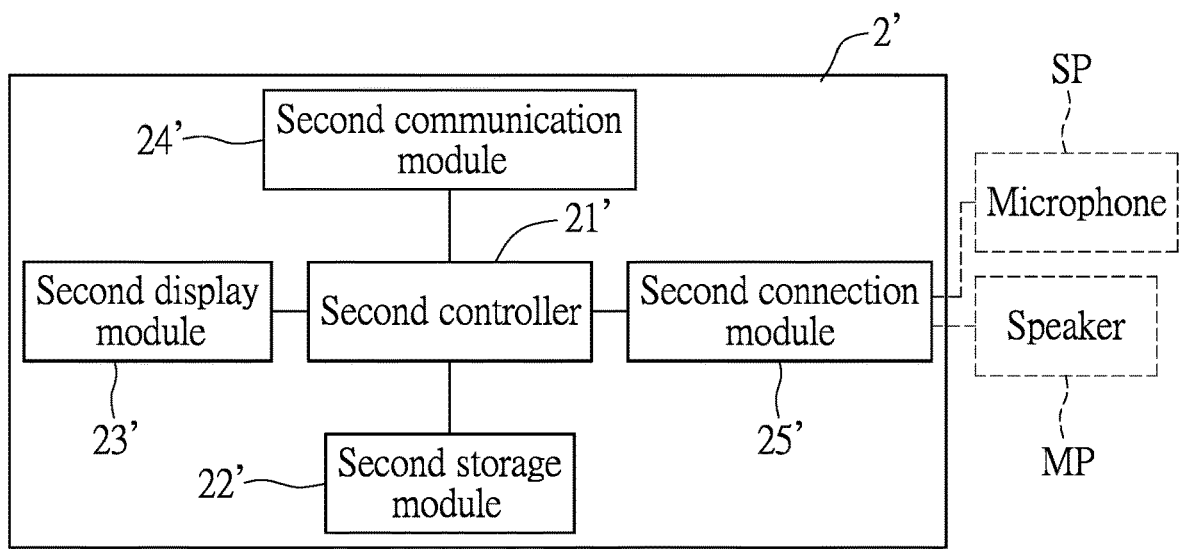
FIG. 16 is a functional block diagram of the image processing system according to the third embodiment of the present disclosure.
Figure 17:
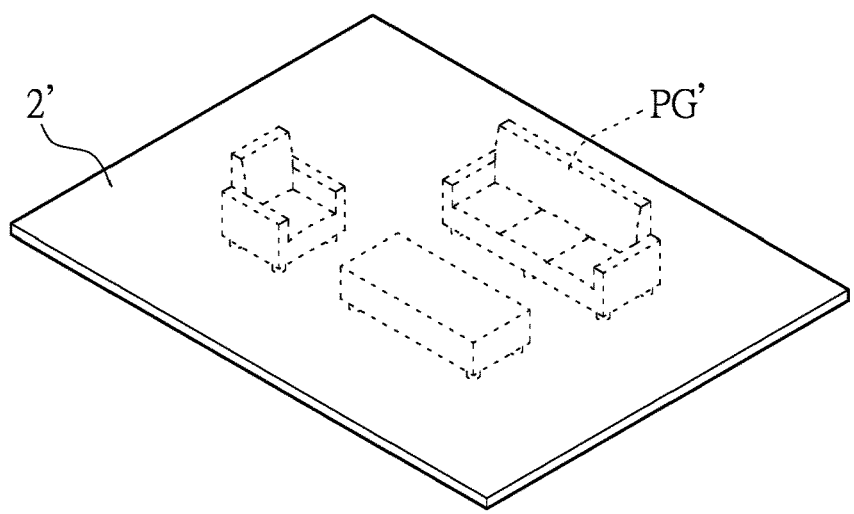
FIG. 17 is another schematic view of the image processing system according to the third embodiment of the present disclosure.

Reference is made to FIG. 15 to FIG. 17, in which FIG. 15 is a schematic view of an image processing system according to a third embodiment of the present disclosure, FIG. 16 is a functional block diagram of the image processing system according to the third embodiment of the present disclosure, and FIG. 17 is another schematic view of the image processing system according to the third embodiment of the present disclosure.

Referring to FIG. 15 and FIG. 16, an image processing device 2' includes a second controller 21', a second storage module 22', a second display module 23', a second communication module 24' and a second connection module 25'. The second controller 21' is correspondingly and electrically connected to the second storage module 22', the second display module 23', the second communication module 24' and the second connection module 25'.

The second display module 23' can display a two-dimensional image information and a three-dimensional image information.

In the present embodiment, the second controller 21' can be a central processing unit (CPU), an application specific integrated circuit (ASIC), a graphics processing unit (GPU) or a microcontroller (MCU).

The second storage module 22' is a flash memory, a read-only memory, a programmable read-only memory, an electrically rewritable read-only memory, an erasable and programmable read-only memory or an electrically-erasable programmable read-only memory.

The second communication module 24' can include a wired communication unit (not shown in the figures) and a wireless communication unit (not shown in the figures). The wired communication unit of the second communication module 24' (not shown in the figures) can be set up independently. The wireless communication unit of the second communication module 24' (not shown in the figures) can be a WI-FI® communication unit, a BLUETOOTH® communication unit, a Zigbee® communication unit, a LoRa communication unit, a Sigfox communication unit or an NB-IoT communication unit. In the present embodiment, the sensor 3 is an image capturing unit such as CCD. The second display module 23' can be a liquid crystal display, a micro LED display or an OLED display.

The second connection module 25' can be a type-A USB connector, a LIGHTNING® connector, a type-C USB connector or a micro-USB connector.

In addition, the second display module 23' further includes a touch processing unit (not shown in the figures), which can receive a plurality of touch signals.

Further, the second program is provided in the image processing device 2'. The second program is an image processing program for processing the two-dimensional image information or the three-dimensional image information.

The user can first control the second program of the image processing device 2' to process the image information by touch or by an external input device, such as a mouse device, a keyboard device, a stylus, a drawing board, etc., connected to the second connection module 25'.

In addition, the image processing device 2' can display a two-dimensional image information or a three-dimensional image information corresponding to a plurality of processing keys for processing the image information in the second program. Moreover, the image processing device 2' can also display a three-dimensional image information of a project image information PG' processed by the second program.

As shown in FIG. 16, the project image information PG' is a three-dimensional image information. In the present embodiment, when the project image information PG' is displayed as a three-dimensional image information through the image processing device 2', the user can adjust the content of the project image information PG' by a hand or an article. At this time, the contents of which the user adjust the project image information PG' and the adjusted contents of the project image information PG' are simultaneously stored in the second storage module 22' of the image processing device 2'. The image processing device 2' can transmit a data of the project image information PG' to the server 9 through the second communication module 24'.

In the present embodiment, the image processing device 2' can further include a microphone MP and a speaker SP. The microphone MP and the speaker SP are correspondingly connected to the image processing device 2'.

The user can use an audio control signal to control and interact with the two-dimensional image information or the three-dimensional image information of the image processing device 2' through the microphone MP and the speaker SP.

In addition, the image processing device 2' can communicate with a server (not shown in the figures) through a communication module (not shown in the figures). The server (not shown in the figures) can perform a calculation of a large number of three-dimensional project image information. That is, in the present embodiment, the calculation of the two-dimensional image information and the three-dimensional image information can be performed by the image processing device 2', or can be done through cloud computing on the remote server (not shown in the figures), and then the two-dimensional image information that is calculated or the three-dimensional image information that is calculated is transmitted to the image processing device 2'.

Fourth Embodiment

Figure 18:
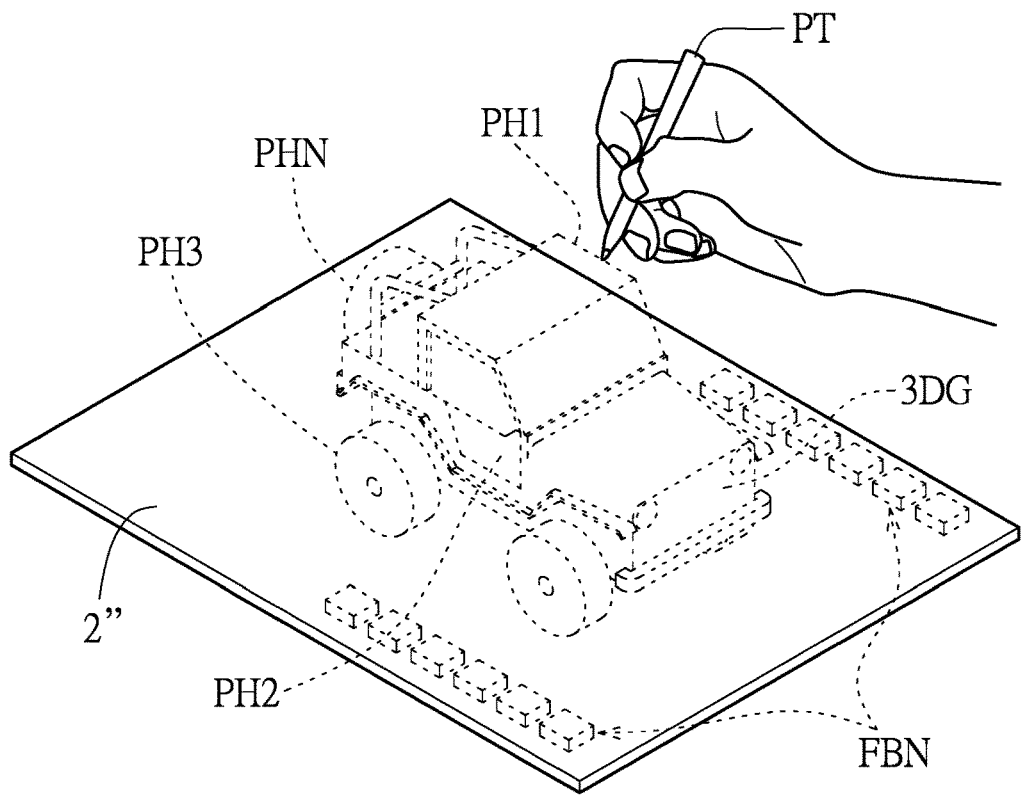
FIG. 18 is a schematic view of an image processing system according to a fourth embodiment of the present disclosure.
Figure 19:
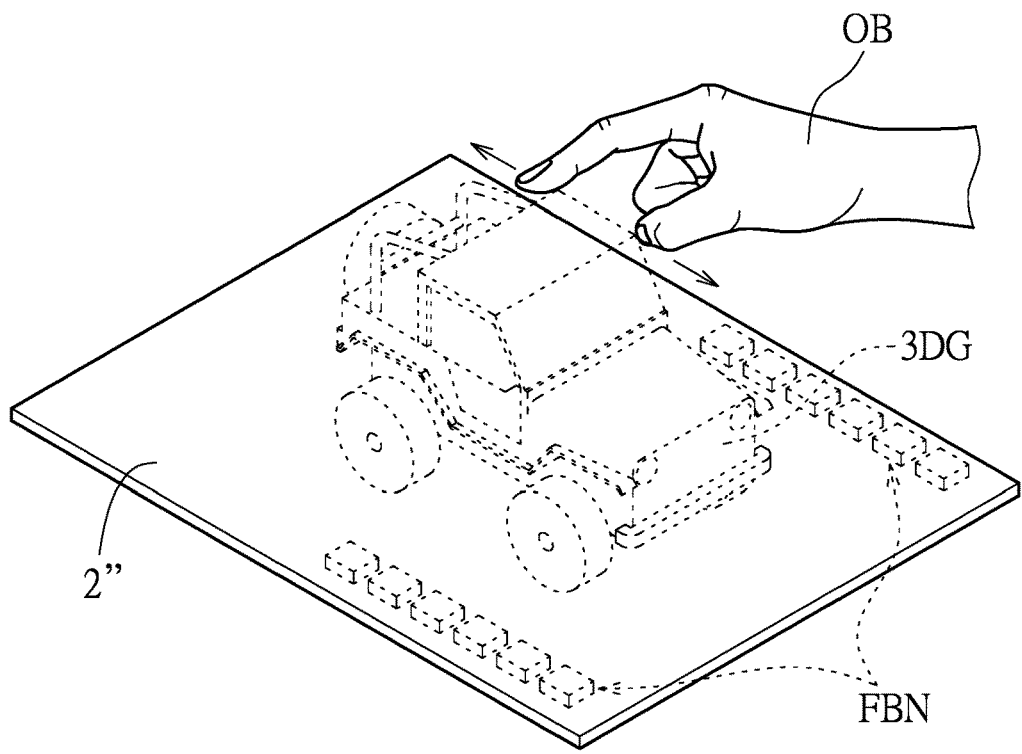
FIG. 19 is another schematic view of the image processing system according to the fourth embodiment of the present disclosure.
Figure 20:
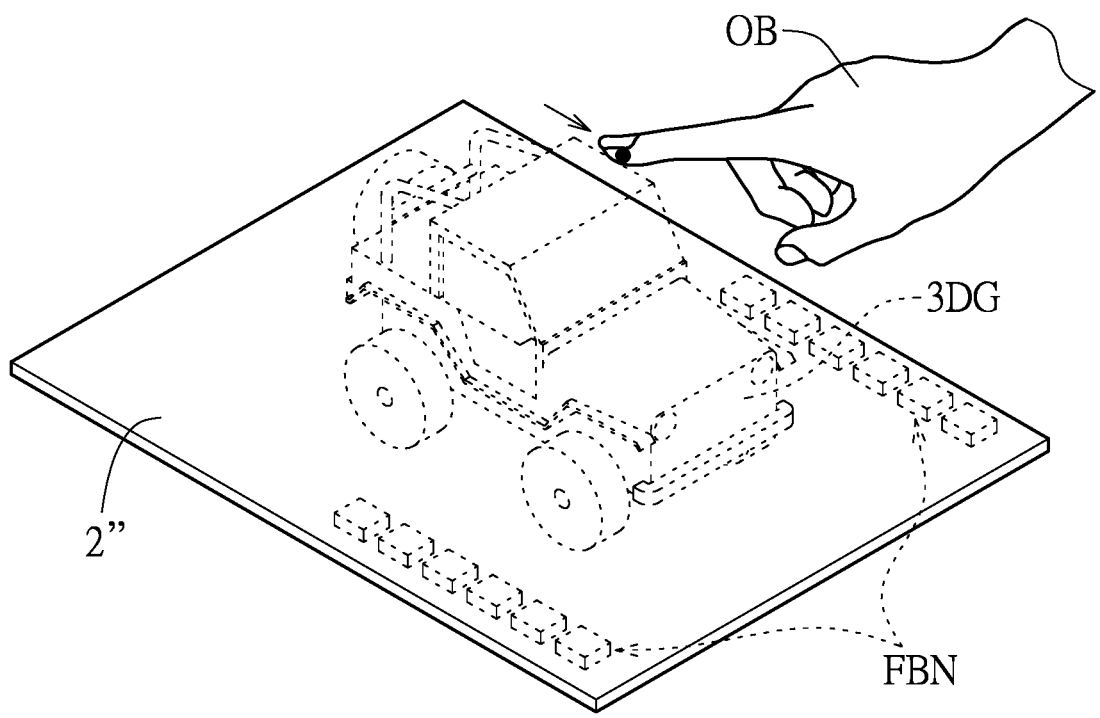
FIG. 20 is still another schematic view of the image processing system according to the fourth embodiment of the present disclosure.
Figure 21:
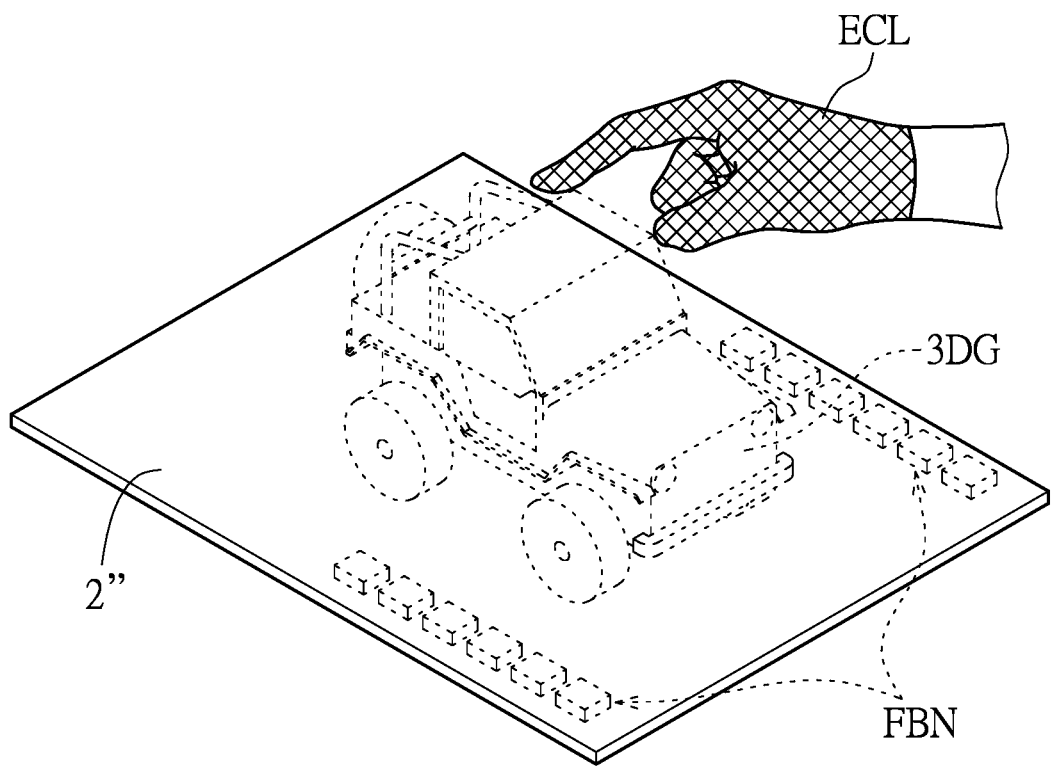
FIG. 21 is yet another schematic view of the image processing system according to the fourth embodiment of the present disclosure.
Figure 22:
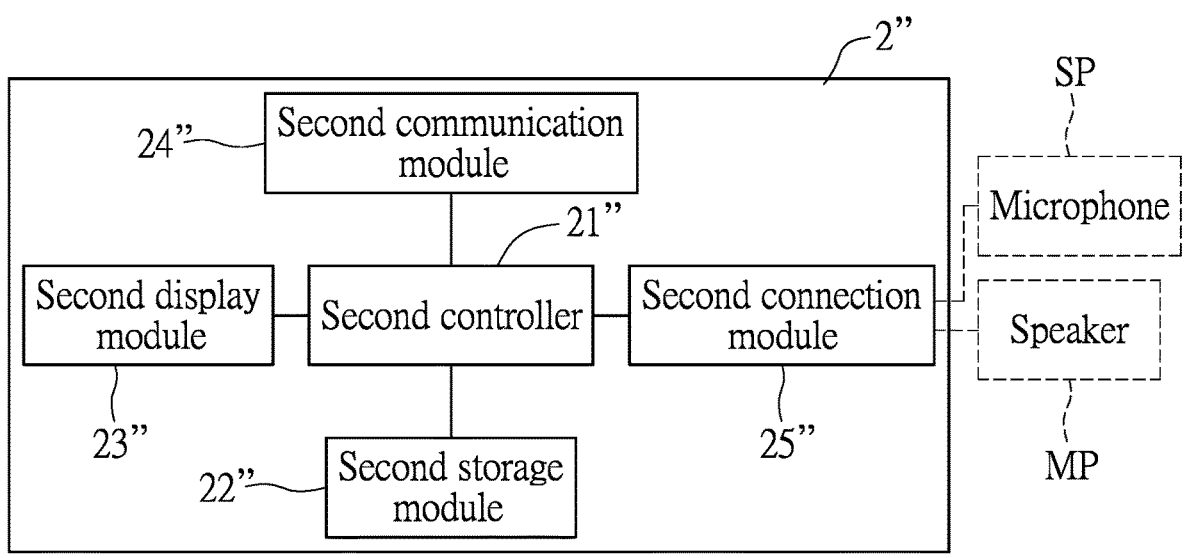
FIG. 22 is a functional block diagram of the image processing system according to the fourth embodiment of the present disclosure.

Reference is made to FIG. 18 to FIG. 22, in which FIG. 18 is a schematic view of an image processing system according to a fourth embodiment of the present disclosure, FIG. 19 is another schematic view of the image processing system according to the fourth embodiment of the present disclosure, FIG. 20 is still another schematic view of the image processing system according to the fourth embodiment of the present disclosure, FIG. 21 is yet another schematic view of the image processing system according to the fourth embodiment of the present disclosure, and FIG. 22 is a functional block diagram of the image processing system according to the fourth embodiment of the present disclosure.

In the present embodiment, an image processing device 2" includes a second controller 21", a second storage module 22", a second display module 23", a second communication module 24", a second connection module 25" and a sensor 26". The second controller 21" is correspondingly and electrically connected to the second storage module 22", the second display module 23", the second communication module 24", the second connection module 25" and the sensor 26".

The second display 23" can display a two-dimensional image information and a three-dimensional image information.

In the present embodiment, the second controller 21" can be a central processing unit (CPU), an application specific integrated circuit (ASIC), a graphics processing unit (GPU) or a microcontroller (MCU).

The second storage module 22" is a flash memory, a read-only memory, a programmable read-only memory, an electrically rewritable read-only memory, an erasable and programmable read-only memory or an electrically-erasable programmable read-only memory.

The second communication module 24" can include a wired communication unit (not shown in the figures) and a wired communication unit (not shown in the figures). The wired communication unit of the second communication module 24" (not shown in the figures) can also be set up independently. The wireless communication unit of the second communication module 24" (not shown in the figures) can be a WI-FI® communication unit, a BLUETOOTH® communication unit, a Zigbee® communication unit, a LoRa communication unit, a Sigfox communication unit or an NB-IoT communication unit. In the present embodiment, the sensor 26" is an image capturing unit such as CCD. The second display module 23" can be a liquid crystal display, a micro LED display or an OLED display.

The second connection module 25" can be a type-A USB connector, a LIGHTNING® connector, a type-C USB connector or a micro-USB connector.

In the present embodiment, the image processing device 2" can further include a microphone MP and a speaker SP. The microphone MP and the speaker SP are correspondingly connected to the image processing device 2". The user can use an audio control signal to control and interact with the two-dimensional image information or the three-dimensional image information of the image processing device 2" through the microphone MP and the speaker SP.

Further, a second program is provided in the image processing device 2". The second program is an image processing program for processing the two-dimensional image information or the three-dimensional image information.

In the present embodiment, the sensor 26" is used to detect a coordinate value of a predetermined detection point of an object OB, i.e., a user's hand, such as a user's index finger, at least one predetermined coordinate value of an electronic interactive glove ECL, or a predetermined coordinate value of a pen tip of a pen-type interactive component PT. The sensor 26" continuously records a movement track of the predetermined detection point of the object OB within a predetermined time. The sensor 26" transmits a plurality of coordinate values of the movement track of the predetermined detection point of the object OB within the predetermined time to the second controller 21". The second controller 21" displays the movement track PH1 in a space on one side of the image processing device 2" through the second display module 23". That is, the user can use the image processing device 2" to directly draw lines, planar compositions or three-dimensional compositions arranged in a space.

The user can draw a plurality of tracks PH1-PHN in a space on one side of the image processing device 2" using the hand OB, the pen-type interactive component PT or the electronic interactive glove ECL. These tracks are then moved, adjusted or connected to create a three-dimensional project image information 3DG.

In addition, the second program in the image processing device 2" includes a plurality of function processing programs which correspond to a plurality of three-dimensional function buttons FBN. The plurality of three-dimensional function buttons FBN are displayed in the same space on the one side of the image processing device 2" as the three-dimensional project image information 3DG through the second display module 23".

The user can select one of the plurality of three-dimensional function buttons FBN, such as coloring, enlarging, adjusting the material, etc., to process partial or all areas of the three-dimensional image information 3DG.

That is, the user can selectively process flat areas, three-dimensional areas or all areas formed by the plurality of tracks. Similar to the previous embodiments, the three-dimensional image information 3DG can be displayed in a space on one side of the image processing device 2" in a form of an exploded view.

In addition, the image processing device 2" can communicate with a server (not shown in the figures) through the second communication module 24". The server (not shown in the figures) can perform a calculation of a plurality of tracks of a large number of three-dimensional project image information 3DG. In the present embodiment, the calculation of the two-dimensional image information and the three-dimensional image information can be performed by the image processing device 2", or can be done through cloud computing on the remote server (not shown in the figures), and then the two-dimensional image information that is calculated or the three-dimensional image information that is calculated is transmitted to the image processing device 2".

BENEFICIAL EFFECTS OF THE EMBODIMENTS

In conclusion, the image processing system and the image processing device can not only complete the general image processing procedure on the computer, but can also directly display the two-dimensional or the three-dimensional image information in the upper space of the image processing device. The user can directly and more intuitively interact with the three-dimensional image information displayed and control and adjust the three-dimensional image information using the gesture or the audio information.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. An image processing system, comprising:
an electronic device; and
an image processing device connected to the electronic device, the image processing device being plate-shaped, the image processing device being an image display device, and providing a plurality of light in a space above the image processing device to form a floating three-dimensional input device image information above the image processing device, the image processing device being disposed at a place that a user is capable of using an object to touch and interact the light of the floating three-dimensional image information above the image processing device, the floating three-dimensional image information being disposed between the user and the electronic device;
wherein a plurality of interactions between the floating three-dimensional input device image information and the object are detected by the image processing device to generate a plurality of control signals and the plurality of control signals are transmitted to the electronic device, and a plurality of coordinate value of the object and the floating three-dimensional input device image information are detected by the image processing device, and the plurality of coordinates of the object and the floating three-dimensional input device image information are corresponding to the plurality of interactions thereof;
wherein a first program is provided in the electronic device, the electronic device controlling a projection in the first program according to the plurality of control signals transmitted by the image processing device;
wherein the electronic device displays a projection image information of the projection in the first program through the image processing device;
wherein, when the object interacts with the projection image information, the image processing device generates a plurality of interactive control signals and provides the interactive control signals to the electronic device, and the electronic device controls the projection of the first program according to the plurality of interactive control signals;
wherein the image processing device further includes at least one switch key image information, and the image processing device, through the object interacting with the at least one switch key image information, generates a switch signal to display another three-dimensional input device image information;
wherein the floating three-dimensional input device image information includes a mouse device image information, a keyboard image information, a touchpad device image information or a handwriting tablet device image information;
wherein the projection image information includes a plurality of projection sub-image information, a plurality of three-dimensional coordinate values of the object and a plurality of first three-dimensional coordinate values of one of the plurality of projection sub-image information determining a plurality of second three-dimensional coordinate values of the one of the plurality of projection sub-image information.

2. The image processing system according to claim 1, wherein the plurality of second three-dimensional coordinate values of the one of the plurality of projection sub-image information are different from the plurality of first three-dimensional coordinate values of the one of the plurality of projection sub-image information.

3. The image processing system according to claim 2, wherein the image processing device displays a three-dimensional projection image information of the projection image information on one side of the image processing device, the three-dimensional projection image information is rotated according to a predetermined angular velocity, and the object interacts with the rotating three-dimensional projection image information to cause a deformation of the three-dimensional projection image information, so as to generate a deformed three-dimensional projection image information.

4. An image processing device, comprising:
a controller;
a display module;
a sensor; and
a communication module, the communication module being correspondingly and electrically connected to the display module, the sensor and the controller;
wherein the sensor detects a plurality of coordinate values of at least one predetermined detecting point of an object and records the plurality of coordinate values as a track;
wherein the sensor detects and records the plurality of tracks of the object, and the controller displays the plurality of tracks of the object in a space on one side of the image processing device to form a three-dimensional projection image information, the three-dimensional projection image information is displayed on a space of one side of the image processing device, and the three-dimensional projection image information is displayed by a plurality of lights provided by the image processing device;
wherein the sensor detects an interaction between a plurality of light of the object and the three-dimensional projection image information to adjust the three-dimensional projection image information, the three-dimensional projection image information being disposed between a user and the image processing device.

5. The image processing device according to claim 4, further comprising a storage module electrically connected to the controller, a program is provided in the storage module, the image processing device displaying a plurality of function buttons corresponding to a plurality of function programs of the program in the space on the one side of the image processing device, and the object interacting with the plurality of function buttons to adjust the three-dimensional projection image information.

6. An image processing system, comprising:
an electronic device; and
an image processing device connected to the electronic device, the image processing device being plate-shaped;
wherein the image processing device displays a floating three-dimensional projection image information, and the image processing device interacts with an object through the three-dimensional projection image information to generate a plurality of control signals and transmits the plurality of control signals to the electronic device;
wherein the image processing device displays the three-dimensional projection image information on one side of the image processing device, the three-dimensional projection image information is capable of rotating according to a command, and the object directly touches and interacts with a plurality of light of the rotating three-dimensional projection image information to cause a deformation of the three-dimensional projection image information, so as to generate a deformed three-dimensional projection image information.

* * * * *